3,252,754
PROCESS FOR EXTRACTION OF THORIA AND CERIA FROM RARE EARTH ORES
Ian C. Kraitzer, Mainbeach, Southport, Queensland, Australia, assignor to Associated Minerals Consolidated Limited, Southport, Queensland, Australia, a company of New South Wales, Australia
Filed Oct. 6, 1960, Ser. No. 60,979
Claims priority, application Australia, Oct. 12, 1959, 53,575/59
2 Claims. (Cl. 23—14.5)

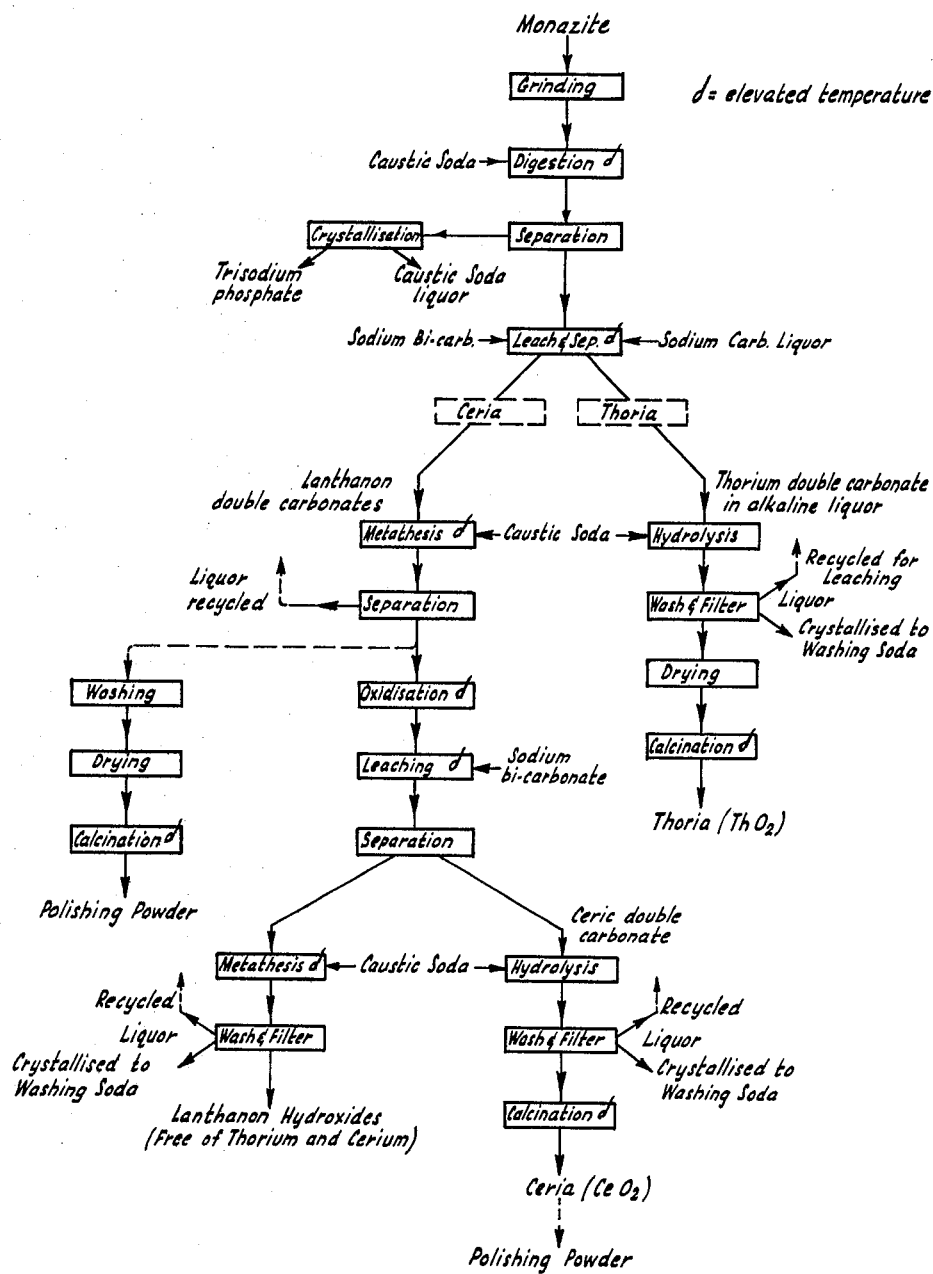

This invention relates to the extraction of thoria (thorium dioxide) and ceria (ceric oxide) from rare earth ores containing thorium and cerium such as monazite.

It is known to treat such rare earth ores hereinafter referred to a monazite with caustic soda so as to obtain mixed hydroxides of the lanthanons and thorium. The latter is then separated from the mixed hydroxides by dissolving the hydroxides in mineral acids and fractionally precipitating the thorium with an alkali. The mixed rare earth hydroxides and thorium hydroxide may also be obtained from the metathesis of rare earth double sulphates and rare earth oxalates derived from digesting monazite with sulphuric acid.

It is also known to selectively leach thorium hydroxide from mixed lanthanon-and thorium-hydroxides by adding acid to the hydroxides until the required acidity (measured on the pH scale) has been attained, resulting in thorium concentrates which are heavily contaminated with relatively large amounts of cerium and thus have to be processed still further.

A further disadvantage of the known methods is the consumption of large quantities of expensive and corrosive acids which are slow in acting and difficult to control, and there is no economical way to recover the acids so used.

Similarly the known methods for the extraction of cerium entail the use of corrosive acids which are consumed in the process.

The use of solvent extraction methods for the isolation of cerium and thorium also suffers from the high consumption of acid necessary to dissolve to total mixed rare earth plus thorium hydroxides.

The above mentioned disadvantages are overcome according to the invention by a process for extraction of thoria and ceria from rare earth ores containing thorium and cerium, in which the rare earth ores are digested to yield mixed hydroxides of lanthanons and thorium and in which said hydroxides are subjected to an alkaline leach under controlled alkalinity and temperature.

The mixed hydroxides of the lanthanons and thorium obtained from the caustic soda digestion of ground monoazite or the mixed rare earth hydroxides obtained from the methathesis of rare earth sulphates derived from the sulphuric acid digestion of monazite, can yield high grade concentrates of thoria and ceria by leaching with alkaline solutions under controlled conditions of hydrogen ion concentration and temperature as described in detail hereinafter.

This improved method for the separation of thoria from the lanthanons depends on the formation of rare earth and thorium compounds with alkali carbonate or bicarbonate. The thorium compound can be selectively leached provided certain conditions are observed.

Thorium and ceric cerium like many other weakly basic metals yield carbonates which hydrolyse readily. The presence of caustic soda in sodium carbonate solutions causes these metals to precipitate hydroxides which are less soluble than the carbonates. The carbonates of thorium and ceric cerium may dissolve in excess alkali carbonate forming double carbonates. However, the presence of hydroxyl ion causes thorium or ceric cerium to be precipitated. To retain thorium double carbonate or ceric double carbonate in solution under stable conditions, an excess of bicarbonate ion or carbonate ion is necessary.

The process of the invention will now be described in connection with the drawing showing a flow diagram for this process.

The raw material, for example, thorium containing monazite is ground and treated with a caustic soda solution at elevated temperature to yield mixed hydroxides of thorium and lanthanon. These hydroxides are separated from the trisodium phosphate and excess caustic soda solution by filtration or decantation. The still wet hydroxides are subjected to a leach of sodium carbonate and sodium bicarbonate in solution. The mixture is stirred and heated and the alkalinity is controlled by adding bicarbonate to maintain a predetermined pH value between 9.5 and 10.0. Under these conditions thoruim double carbonate and lanthanon double carbonate are formed, and the thorium compound goes into solution. Counter-current leaching can be used to advantage in this process. The pregnant leach liquor (containing the thorium double carbonate) is then separated from the insoluble lanthanon double carbonate and both carbonates can now be treated separately for the extraction of thoria and ceria.

In the thoria extracting process the pregnant leach liquor is hydrolyzed with caustic soda thus causing the thorium concentrate to precipitate. The resulting precipitate is separated from the barren liquor by filtration or decantation, then washed and dried to remove excess water and calcined to yield thoria.

The above mentioned barren liquor containing sodium carbonate can partly be re-cycled for the above mentioned leaching step of the mixed hydroxides and can partly be crystallised to form washing soda (crystalline sodium carbonate).

For the extraction of ceria the above mentioned lanthanon double carbonates are digested with a caustic soda solution at elevated temperature to yield lanthanon compounds including cerium compounds and a solution of caustic soda and sodium carbonate. The compounds are separated from the liquor by filtration or decantation, and the latter can be recycled to be used for the precipitation of thorium concentrate as mentioned above.

The lanthanon compounds are dried in the presence of oxygen at elevated temperature to oxidize the cerium compound contained in said lathanon compounds. These compounds are leached with sodium carbonate and sodium bicarbonate in solution as described earlier to form lanthanon double carbonates including ceric double carbonate, which latter carbonate goes into solution.

The pregnant leach liquor (containing the ceric double carbonate) is separated from the remaining insoluble lanthanon double carbonates by filtration or decantation, and is then hydrolyzed by adding caustic soda, thus causing the cerium concentrate to precipitate. The resulting precipitate is separated from the barren liquor by known methods, is subsequently washed and filtered and then calcined to form ceria.

The barren leach liquor containing sodium carbonate can partly be re-cycled as mentioned earlier in connection with the production of thoria to be used in the various leaching operations and can partly be crystallised to yield washing soda.

The insoluble lanthanon double carbonates can be digested with a caustic soda solution at elevated temperature (metathesed) to yield lanthanon hydroxides and a solution of caustic soda and sodium carbonate, which is separated off by filtration or decantation and is recycled for use in the above mentioned hydrolysis of the cerium containing solution. The lanthanon compounds resulting from the methathesis of the double carbonates are washed until free of alkali and dried. The product can be used for the extraction of the individual lanthanons still contained therein.

The thoria produced by the above described process provides an ideal starting product for the manufacture of pure thorium compounds required, for example, in nuclear energy work. The thoria as produced is also widely used in ceramic and refractory industries.

The ceria, on the other hand, can be used for the production of cerium compounds to manufacture cerium metal and cerium alloys for metallurgy. When calcined under controlled conditions of temperature and time, the ceria yields a high grade polishing powder as used in glass, optical and stone and metal industries.

Such a polishing powder can be gained also from the lanthanon compounds derived by metathesis from the lanthanon double carbonates after separation from the alkaline liquor. The lanthanon compounds are washed until free of alkali, are then dried to remove excess water and then calcined at a temperature of 1100° to 1200° C. The resultant powder is of average particle size of 2 to 4 microns with a complete absence of particles greater than 10 microns and is thus extremely useful for the polishing of optical glass, mirrors, electroplate and stone.

In the above described process sodium bicarbonate and sodium carbonate have been used in the alkaline leach. Sodium bicarbonate may replace the sodium carbonate entirely but the material cost is generally higher.

Instead of adding sodium bicarbonate to control the alkalinity of the carbonate leach liquor, the liquor can be contacted with carbon dioxide gained, for example, from waste flue gas.

One example of the above process is given hereinafter:

40 lbs. of monazite are ground to pass through a 300 mesh screen and is digested with 52 lbs. of caustic soda in 4 gallons of water. This yields 28 lbs. of mixed hydroxides which are slurried with 40 gallons of sodium carbonate solution containing 1.5 lbs. of sodium carbonate per gallon. This slurry is rapidly heated to 80° C. 38 lbs. of sodium bicarbonate are now added and further quantities may be added until the pH value is about 9.5 to 10.0, while the slurry is agitated for 15 to 35 minutes at a temperature of 70 to 80° C.

The pregnant leach liquor after separating the lanthanon double carbonate is digested with 0.5 to 2.0 lbs. of caustic soda at a temperature of 40 to 80° C. to precipitate the thorium compound. The compound when dried at temperatures up to 120° C. contains 55–60% thoria and is readily soluble in dilute acid.

By calcining the compound at temperatures of 550 to 600° C. a 90–95% thoria is obtained.

The lanthanon double carbonate is metathesed with 25 to 30 lbs. of caustic soda in 20 gallons of water at boiling temperature. The resultant lanthanon compounds are dried at 110 to 120° C. until the cerium compound has been oxidized to the ceric (quadrivalent) state.

The ceric compound is then leached out of the lanthanon compounds as described above for the thorium compounds to yield ceric double carbonate in solution. The pregnant leach liquor after separating the insoluble lanthanon carbonates is treated in the same way as described in the production of thoria to percipitate the cerium compound. The latter is then subjected to a calcination process at temperatures of 550 to 600° C. and yields a 95% ceria.

I claim:
1. In a process of extracting thoria and ceria from rare earth ores containing thorium and cerium, the step of separating the thoria values therefrom, comprising digesting the rare earth ores to obtain mixed hydroxides of lanthanons and thorium, heating said mixed hydroxides with an aqueous solution of sodium carbonate and sodium bicarbonate at a temperature of about 80° C. and at a pH of about 9.5 to 10, whereby the thorium content goes into solution as the thorium double carbonate; and separating said solution from the insoluble material.

2. Process as defined in claim 1, including the hydrolysis of the thorium double carbonate to precipitate thorium concentrate.

References Cited by the Examiner

UNITED STATES PATENTS

| | | | |
|---|---|---|---|
| 617,636 | 1/1899 | Buddeus | 23—14.5 |
| 1,068,730 | 7/1913 | Bleeker | 23—14.5 |
| 1,232,334 | 7/1917 | Kreidl | 23—14.5 |
| 1,307,153 | 6/1919 | Ryan | 23—14.5 |
| 2,783,125 | 2/1957 | Rohden | 23—14.5 |
| 2,811,411 | 10/1957 | Calkins | 23—14.5 |
| 2,815,264 | 12/1957 | Calkins | 23—14.5 |

OTHER REFERENCES

Chemical Engineering Progress 50, 5, pp. 235–239, May 1954.

Deming: General Chemistry, 5th edition (1947), p. 712.

LEON D. ROSDOL, *Primary Examiner.*

ROGER L. CAMPBELL, OSCAR R. VERTIZ, CARL D. QUARFORTH, *Examiners.*

R. D. MORRIS, J. D. VOIGHT, S. TRAUB,
*Assistant Examiners.*